United States Patent
Keeping et al.

(10) Patent No.: US 6,239,211 B1
(45) Date of Patent: May 29, 2001

(54) EMULSIONS CONTAINING SILICONE POLYMERS

(75) Inventors: Stuart Keeping, Overijse (BE); Daniel Joseph Halloran, Midland; Brett Lee Zimmerman, Birch Run, both of MI (US)

(73) Assignees: Dow Corning Corporation, Midland, MI (US); Dow Corning S.A., Seneffe (BE)

( * ) Notice: Subject to any disclaimer, the term of this patent is extended or adjusted under 35 U.S.C. 154(b) by 0 days.

(21) Appl. No.: 09/490,105

(22) Filed: Jan. 24, 2000

(51) Int. Cl.$^7$ .................................................. C08L 83/04
(52) U.S. Cl. ..................... 524/588; 524/837; 8/115.51; 8/DIG. 1; 424/401; 424/70.12; 528/34
(58) Field of Search ......................... 524/837, 588; 424/70.12, 401; 8/DIG. 1, 115.51; 528/34

(56) References Cited

U.S. PATENT DOCUMENTS

| | | | |
|---|---|---|---|
| 2,891,920 | 6/1959 | Hyde | 260/29 |
| 3,294,725 | 12/1966 | Findlay | 260/29 |
| 5,661,215 | * 8/1997 | Gee et al. | 524/837 |

* cited by examiner

Primary Examiner—Margaret G. Moore
(74) Attorney, Agent, or Firm—James L. De Cesare

(57) ABSTRACT

An emulsion containing particles of an organopolysiloxane is prepared by (i) combining a silanol endblocked siloxane, an alkyltrialkoxysilane, water, and a nonionic surfactant or an anionic surfactant; (ii) emulsifying these ingredients by agitating these ingredients or by using a high shear device; (iii) adding a condensation specific acid catalyst to the emulsion; (iv) polymerizing the catalyzed emulsion to form an organopolysiloxane polymer; and (v) continuing polymerizing step (iv) until the resulting organosiloxane polymer has the desired viscosity. Organosiloxane polymers exhibiting improved release properties can be obtained by using alkyltrialkoxysilanes R'Si(OR")$_3$ where R' and R" each represent alkyl groups, and R' contains at least eight, preferably at least twelve, and most preferably at least sixteen or more carbon atoms.

7 Claims, No Drawings

EMULSIONS CONTAINING SILICONE POLYMERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to emulsions containing silicone particles in which the emulsion is prepared by first emulsifying organosilicon oligomers, and then polymerizing the emulsified larger particles of oligomers to a siloxane polymer of higher viscosity and/or higher molecular weight using a condensation specific acid catalyst.

BACKGROUND OF THE INVENTION

While U.S. Pat. No. 2,891,920 (Jun. 23, 1959) and U.S. Pat. No. 3,294,725 (Dec. 27, 1966) each teach the use of condensation specific acid catalysts for polymerizing oligomers to siloxane polymers of higher viscosity and/or higher molecular weight, neither patent suggests that siloxane polymers exhibiting improved release properties can be obtained by including in the process an alkyltrialkoxysilane R'Si(OR")$_3$ where R' and R" represent alkyl groups, and R' contains at least eight, preferably at least twelve, and most preferably at least sixteen or more carbon atoms.

BRIEF SUMMARY OF THE INVENTION

This invention relates to a method of preparing an emulsion containing particles of an organopolysiloxane. The emulsion is prepared by (i) combining a silanol endblocked siloxane oligomer, an alkyltrialkoxysilane oligomer, water, and a nonionic surfactant or an anionic surfactant; (ii) emulsifying the oligomers to form particles in the emulsion, by agitating the ingredients or by using a high shear device; (iii) adding a condensation specific acid catalyst to the emulsion of oligomers; (iv) polymerizing the oligomers to form an organopolysiloxane polymer; and (v) continuing polymerizing step (iv) until the resulting organosiloxane polymer has the desired viscosity, which is preferably a viscosity in the range of about 20,000 to about ten million centipoise (mPa·s).

Emulsions prepared according to this invention are capable of functioning as a means of delivering polymers of high molecular weight and tailored Theological properties to the human body, i.e., as in a shampoo base to provide styling and conditioning benefits to human hair, or as a delivery mechanism for use in skin care applications. They can also be used in paper coating, textile coating, and home care applications, for delivering high molecular weight polymers to various types of surfaces and substrates.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The silanol endblocked siloxane oligomer used herein has a structure which can be represented generally by the formula shown below:

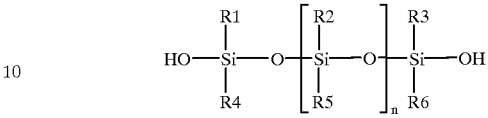

In the formula, the R1 to R6 groups generally comprise an alkyl group containing 1–6 carbon atoms such as methyl, ethyl, propyl, butyl, pentyl, and hexyl; an aryl group such as phenyl; or alkyl and aryl groups. The value of n can vary from 2–300, thus providing oligomers having a viscosity at 25° C. ranging from about 20 to about 100,000 centipoise (mPa·s).

Most preferred are silanol endblocked dimethylsiloxane oligomers of the structure shown below:

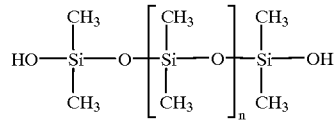

The silanol endblocked dimethylsiloxane oligomer may also contain small amounts of RSiO$_{3/2}$ trifunctional "T" units at random locations in the oligomer chain. This provides a point of branching, and three or more silanol end groups which provide subsequent growth at three or more reaction sites in the same molecule, during the silanol-silanol condensation polymerization.

An alkyltrialkoxysilane R'Si(OR")$_3$ wherein R' and R" each represent an alkyl group is included during the polymerization process. Alkyltrialkoxysilanes undergo hydrolysis with water to form R'Si(OH)$_3$ which participates in the condensation polymerization, or the alkyltrialkoxysilane can react directly with silanols of the siloxane oligomer forming an ≡SiO bond and liberating an alcohol molecule.

Some examples of alkyltrialkoxysilanes are (C1) methyltrimethoxysilane, (C2) ethyltrimethoxysilane, (C3) propyltrimethoxysilane, (C4) n-butyltrimethoxysilane, (C6) hexyltrimethoxysilane, phenyltrimethoxysilane, (C8) octyltrimethoxysilane, octyltriethoxysilane, (C12) dodecyltrimethoxysilane, dodecyltriethoxysilane, (C16) hexadecyltriethoxysilane, hexadecyltrimethoxysilane, (C18) octadecyltriethoxysilane, octadecyltrimethoxysilane, (C20) eicosyltrimethoxysilane, and (C30) triacontyltrimethoxysilane.

However, as noted above, siloxane polymers exhibiting improved release properties can be obtained by including in the process the alkyltrialkoxysilanes wherein R' contains at least eight, preferably at least twelve, and most preferably at least sixteen or more carbon atoms.

According to the method of the present invention, the organosilicon oligomers are first mechanically emulsified in water using an anionic or a nonionic surfactant, and then the catalyst is added to polymerize the emulsified larger particle size oligomers to the desired polymer viscosity.

Useful anionic surfactants include alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitrites such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms; and alkylaryl sulfonates having one or more alkyl groups of eight or more carbon atoms.

Anionic surfactants including olefin sulfonates can also be employed, representative of which are sodium alpha olefin sulfonates sold under the tradename BIO-TERGE AS-40 by the Stephan Company, Northfield, Ill. These sodium $C_{14-16}$ olefin sulfonates are mixtures of long chain sulfonate salts prepared by sulfonation of $C_{14-16}$ alpha olefins. They consist chiefly of sodium alkene sulfonates and sodium hydroxyalkane sulfonates.

Useful nonionic surfactants preferably have a hydrophiliclipophilic balance (HLB) of 10–20. Nonionic surfactants with HLB of less than 10 may be used, but the emulsion stability may be very poor due to limited solubility of the nonionic surfactant in water. When using a nonionic surfactant with HLB less than 10, a nonionic surfactant with HLB greater than 10 should be added during or after polymerization.

Commercial types of nonionic surfactants can be exemplified by 2,6,8-trimethyl-4-nonyloxy polyethylene oxyethanols (6EO) and (10EO) sold under the trademarks TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the trademarks TERGITOL® 15-S-7, TERGITOL® 15-S-9, TERGITOL® 15-S-15; other $C_{11-15}$ secondary alcohol ethoxylates sold under the trademarks TERGITOL® 15-S-12, 15-S-20, 15-S-30, 15-S-40; and octylphenoxy polyethoxy ethanol (40EO) sold under the trademark TRITON® X-405. All of these surfactants are sold by Union Carbide Corporation, Danbury, Conn.

Other types of commercial nonionic surfactants are nonylphenoxy polyethoxy ethanol (10EO) sold under the tradename MAKON 10 by Stepan Company, Northfield, Ill.; polyoxyethylene 23 lauryl ether (Laureth-23) sold commercially under the tradename BRIJ 35L by ICI Surfactants, Wilmington, Del.; and RENEX 30, a polyoxyethylene ether alcohol with an HLB of about 14.5 sold by ICI Surfactants, Wilmington, Del.

The reaction to polymerize the emulsified organosilicon oligomers is carried out in a simple reactor containing water, at least one anionic (ionic) surfactant or nonionic surfactant, and a catalyst.

The condensation specific acid catalyst can be a strong acid such as hydrochloric acid, sulfuric acid, or a sulfonic acid catalyst such as dodecylbenzene sulfonic acid.

The emulsion contains an organosilicon component concentration of 10–90 percent by weight of the total emulsion, preferably 25–60 percent. While emulsions with less than 10 percent silicone content can be made, such emulsions hold little or no economic value.

The catalyst is present in the reaction medium at levels of 0.05–25 percent by weight of the total emulsion. The anionic surfactant is present at 0.05–25 percent by weight of the total emulsion, preferably 0.5–20 percent by weight. The nonionic surfactant is present at 0.1–40 percent by weight of the total emulsion, preferably 0.5–30 percent by weight. Water is present at 10–90 percent by weight of the total emulsion, preferably 20–80 percent by weight.

The method is carried out by creating an emulsion containing the organosilicon oligomers, anionic surfactant or nonionic surfactant, water, and catalyst. The emulsion can be processed at room temperature or it can be heated with agitation at a polymerization reaction temperature until the oligomers have reached the desired polymer viscosity or molecular weight by condensation polymerization.

By condensation herein is meant a chemical reaction in which two or more molecules combine with the separation of water or some other simple substance such as an alcohol. In particular, the condensation polymerization reaction which is characteristic of the process according to the present invention involves and results in the formation of polysiloxanes by the condensation of organosilicon oligomers containing the silanol group $\equiv$SiOH.

Polymerization reaction temperatures are typically above the freezing point, but below the boiling point of water. Pressures above or below atmospheric pressure allow operation outside of this range. At temperatures below room temperature, the polymerization reaction may proceed more slowly. The preferred temperature range is 1–95° C., most preferably 20–50° C.

The polymerization reaction can be stopped at the desired level of polymerization of organosilicon oligomers by using known methods. It is preferred to stop the reaction when the largest amount of oligomer has been reacted, i.e., condensed. Reaction times of less than 24 hours, typically less than 10 hours, are sufficient to achieve the desired polymer viscosity.

The methods for stopping the reaction encompass neutralization of the catalyst by addition of equal or slightly greater stoichiometric amounts of base. Either a strong or weak base may be used to neutralize the reaction. Care must be taken when using a strong base not to over neutralize, as it is possible to re-catalyze the reaction. It is preferred to neutralize with sufficient quantities of base such that the resulting emulsion has a pH of greater than 7 when an anionic surfactant is present.

Some examples of neutralizing agents which may be employed include sodium hydroxide, ammonium hydroxide, potassium hydroxide, sodium carbonate, triethanolamine (TEA), triethylamine, isopropyl amine, and hexamethyldisilazane.

Since emulsions are susceptible to microbiological contamination, a preservative may also be required, and representative compounds which may be employed include formaldehyde, DMDM hydantoin, 5-bromo-5-nitro-1,3-dioxane, methyl paraben, propyl paraben, sorbic acid, imidazolidinyl urea, and 5-chloro-2-methyl-4-isothiazolin-3-one which is a product sold under the tradename KATHON CG by the Rohm & Haas Company, Philadelphia, Pa.

EXAMPLES

The following examples are set forth in order to illustrate this invention in more detail.

Example 1

A mixture was prepared by combining 697.4 gram of water; 59.6 gram of anionic surfactant BIO-TERGE AS-40 sold by the Stephan Company, Northfield, Ill.; 5.6 gram of octyltriethoxysilane (OTES); and 1120 gram of silanol endblocked siloxane oligomer having a structure generally corresponding to the formula

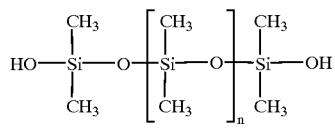

in which n had a value sufficient to provide a viscosity of approximately 75 centipoise (mPa·s).

These ingredients were passed through a sonolator at 1,700 psi (11,721 kPa), and then they were homogenized at 7,000 psi (48,264 kPa). While stirring 800 gram of the resulting homogenized pre-emulsion in a flask, there was added to the flask 18.1 gram of a ten percent aqueous solution of hydrochloric acid as the catalyst. After about two hours, there was added to the flask 15.1 gram of 15 percent aqueous solution of sodium carbonate in order to adjust the pH to about 7. The final emulsion product was formed by adding 6.75 gram of nonionic surfactant RENEX 30, a polyoxyethylene ether alcohol with an HLB of about 14.5 sold by ICI Surfactants, Wilmington, Del.; and 0.7 gram of preservative 5-chloro-2-methyl-4-isothiazolin-3-one, a product sold under the tradename KATHON CG by the Rohm & Haas Company, Philadelphia, Pa.

Example 2

This example is similar to Example 1, and illustrates the inclusion of another different alkyltrialkoxysilane oligomer in the process. The alkyltrialkoxysilane used in this example was hexadecyltriethoxysilane (HDTES). Example 1 was repeated in generally all of its essential detail except that 28.6 gram of this higher alkyl containing alkyltrialkoxysilane was used to prepare the emulsion.

Example 3

This example is similar to Examples 1 and 2, and illustrates the inclusion of yet another different alkyltrialkoxysilane oligomer in the process. The alkyltrialkoxysilane used in this example was methyltrimethoxysilane (MTMS). Examples 1 and 2 were repeated in generally all of their essential detail except that varying amounts of this lower alkyl containing alkyltrialkoxysilane were used to prepare emulsions. Reference may be had to Table I.

The silicone polymers extracted from emulsions prepared in Examples 1 and 2 possess unique rheological properties which can be best characterized by their elastic or storage modulus G'. The procedure used for making this determination is shown below.

Rheology—Flow Procedure

This procedure used a Carrimed Controlled Stress Cone and Plate Rheometer made by Carrimed Ltd., Interpret House, Curtis Road Industrial Estate, Dorking, Surry RH 4 1DP, England. The rheometer was equipped with DOS software for flow experiments. A pre-shear stress of 10,000 dynes/cm$^2$ was applied for one minute, and the sample was allowed to equilibrate for four minutes. The sample was then subjected to stress in log mode from 10 dynes/cm$^2$ to 10000 dyne/cm$^2$, with seven steps of 3 minutes at each step. All experiments were conducted at 25° C.

By way of explanation, the viscoelastic properties of a given material can be expressed in terms of its storage modulus G' which is a measure of elasticity. G' is associated with the energy stored in elastic deformation, and is approximately equal to the elastic modulus determined in creep and stress-relation experiments. The value of G' is high when a polymer is in its glassy state, and the value of G' drops with increasing temperature as the polymer goes through the glass transition and becomes soft and rubbery.

If the polymer is crosslinked, the storage modulus does not drop as far after the glass transition. The exact level depends upon the degree of crosslinking. Carri-Med CS rheometers are unique in this regard as they are computer-driven controlled-stress instruments and versatile viscometers capable of making flow-curve measurements as a function of shear rate, as well as shear stress, creep, and recovery measurements, and simulate stress-controlled processes.

Table I shows the results which were obtained in determining G' for various of the polymers extracted from the emulsions prepared in Examples 1–3.

TABLE I

| Example | Silane Oligomer | Weight Percent Silane Oligomer | Reaction Time, hours | G', Pa |
|---|---|---|---|---|
| 3-a | MTMS | 0.56 | 30 | 5701 |
| 3-b | MTMS | 3.00 | 16 | 7586 |
| 3-c | MTMS | 3.00 | 24 | 7514 |
| 3-d | MTMS | 3.00 | 48 | 8124 |
| 1-a | OTES | 0.28 | 30 | 2004 |
| 1-b | OTES | 1.02 | 30 | 1740 |
| 2-a | HDTES | 1.43 | 5 | 3 |
| 2-b | HDTES | 1.43 | 22 | 384 |
| 2-c | HDTES | 1.43 | 30 | 1053 |
| 2-d | HDTES | 1.43 | 54 | 2872 |
| 2-e | HDTES | 1.43 | 70 | 3475 |
| 2-f | HDTES | 1.43 | 142 | 3950 |

In Table I, it can be seen that the value of G' drops as the length of the alkyl group of the alkyltrialkoxysilane oligomer increases.

Example 4

Release Property

The release property of polymers extracted from emulsions prepared in Examples 1–3 was determined by placing a small amount of polymer between two fingers and drawing the fingers apart. Polymers prepared from methyltrimethoxysilane MTMS were sticky and would not release from the fingers when the fingers were pulled apart. While the polymers prepared from octyltriethoxysilane OTES were also sticky, they would release from the fingers when the fingers were pulled apart. Polymers prepared from hexadecyltriethoxysilane HDTES were also sticky, but would also release from the fingers when the fingers were pulled apart.

These release characteristics would be expected to provide useful properties in applications such as hair care, skin care, home care, textiles, and paper.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of preparing an emulsion containing particles of an organopolysiloxane polymer comprising: (i) forming a mixture containing a silanol endblocked siloxane, an alkyltrialkoxysilane, water, and a nonionic surfactant or an anionic surfactant; (ii) emulsifying the mixture by agitating or shearing the mixture; (iii) adding a condensation specific acid catalyst to the resulting emulsion; (iv) polymerizing the catalyzed emulsion to form an organopolysiloxane polymer; and (v) continuing polymerizing step (iv) until the organopolysiloxane polymer has attained the desired viscosity; the alkyltrialkoxysilane having the formula R'Si(OR")$_3$ where R' and R" represent alkyl groups, and R' contains sixteen or more carbon atoms.

2. A method according to claim 1 in which the silanol endblocked siloxane has the formula

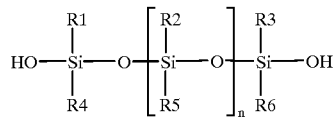

wherein R1 to R6 represent an alkyl group containing 1–6 carbon atoms or an aryl group, and n is 2–300, the silanol endblocked siloxane oligomer having a viscosity at 25° C. ranging from about 20 to about 100,000 centipoise (mPa·s).

3. A method according to claim 1 in which the emulsion is prepared at temperatures in the range of 1–95° C.

4. A method according to claim 1 in which the alkyltrialkoxysilane is selected from the group consisting of octyltrimethoxysilane, octyltriethoxysilane, dodecyltrimethoxysilane, dodecyltriethoxysilane, hexadecyltriethoxysilane, hexadecyltrimethoxysilane, octadecyltriethoxysilane, octadecyltrimethoxysilane, eicosyltrimethoxysilane, and triacontyltrimethoxysilane.

5. An emulsion prepared according to the method defined in claim 1.

6. A method of treating a surface or substrate selected from the group consisting of hair, skin, paper, and textile, comprising applying to the surface or substrate the emulsion prepared according to the method defined in claim 1.

7. A method of treating hair comprising applying to hair the emulsion prepared according to the method defined in claim 1.

* * * * *